M. HUBBELL.
Clover Huller.
No. 105,945.　　　　　　　　Patented Aug. 2, 1870.
Fig. 1
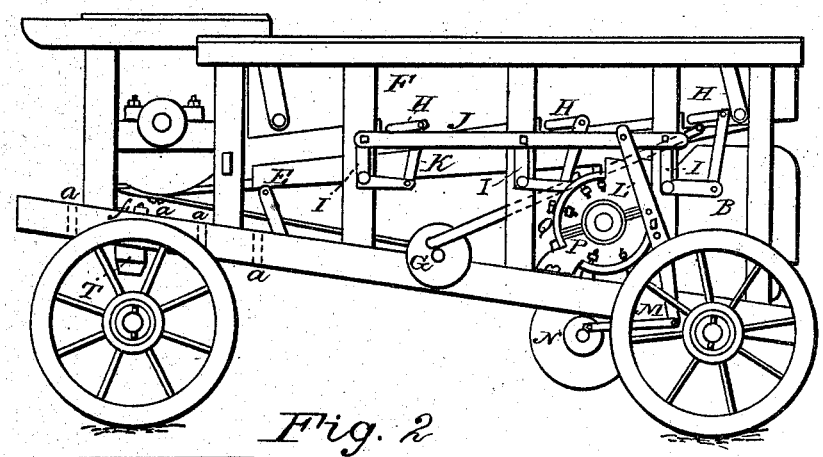
Fig. 2
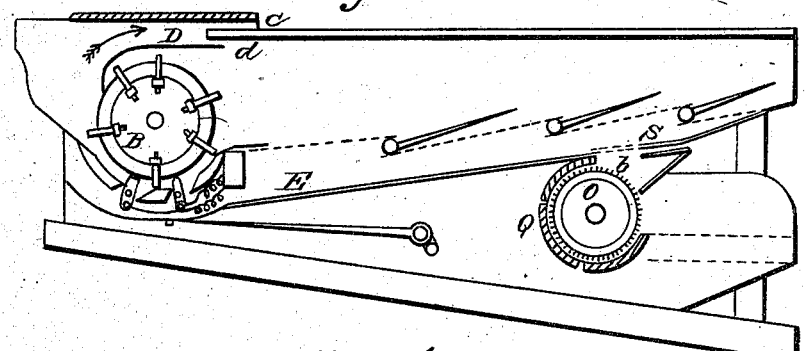
Fig. 3　　Fig. 4　　Fig. 5
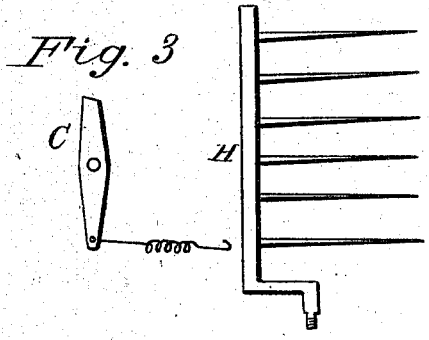
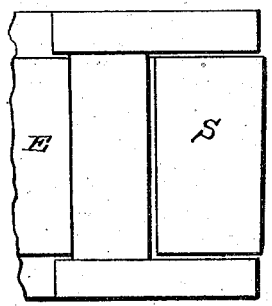
Witnesses　　　　　　　　　　Inventor
William H. Bolle　　　　　　　Monroe Hubbell
Charles Ketchum

United States Patent Office.

MONROE HUBBELL, OF REYNOLDSVILLE, NEW YORK.

Letters Patent No. 105,945, dated August 2, 1870.

IMPROVEMENT IN GRAIN-THRASHING AND CLOVER-HULLING MACHINES.

The Schedule referred to in these Letters Patent and making part of the same.

I, MONROE HUBBELL, of Reynoldsville, in the county of Schuyler and State of New York have invented certain Improvements in a Combined Grain-Thrasher and Clover-Huller, of which the following is a specification.

The nature and object of my invention relates to making teeth for a concave of a thrasher, that are held in position by a spring, so that, when a stone gets in, the teeth will turn and let it pass without breaking the teeth, and putting in one frame a thrashing and a hulling-cylinder, and so constructing and arranging the other parts that they may be used both for grain seed, and to separate and clean the same without changing or removing any of its parts, or using grain-elevators.

Figure 1 is a side elevation;
Figure 2, a longitudinal vertical section;
Figure 3, a view of a concave-tooth;
Figure 4, a top view of the agitators; and
Figure 5 is a top view of the rear end of the conveyer.

A is the frame. It is made to support two cylinders, as represented in fig. 1. It is made to be carried and used upon wheels as wagon-wheels. The sills are to be placed at an inclination, the forward end the highest, and they are supported in that position by the wagon.

Their position may be varied by putting the bolts that hold them to the wagon at the forward end into any of the holes *a*. Thus the inclination of the machine may be varied, to make the parts of the machine work well.

Any required number of posts may be put into the sills, and they must be of such length that the plates on their upper ends will be nearly horizontal.

The frame should be made so as to hold the thrashing-cylinder so high that the grain or seed may be conveyed without being elevated to the hulling-cylinder or winnower, and to convey the straw out of the machine without elevating it. The frame should be made to support any ordinary straw-carrier.

B is the thrashing-cylinder. It may be made in any ordinary manner, and may be driven by a belt from a horse-power, or with shafting and cog-wheels. It must have a driving-pulley at each end for belts, to transmit power to the hulling-cylinder.

The thrashing-concave must be made of open work, either wood or iron, so that the teeth may be placed as represented in fig. 2, and may be made for any number of rows of teeth.

C is one of a series of teeth for the concave. They are made as represented in figs. 2 and 3. They are made with a hole through them, nearly equidistant from each end, so that they may be supported by an iron rod that passes from one side of the machine to the other, and through them. They are kept in place by means of collars on the rod between them. This rod may be supported in the middle, when necessary, and the rods may be supported by adjustable supports, so that the teeth may be raised or lowered at will. The lower ends of the teeth have holes to attach a spring, so that the spring may hold them in position while thrashing; and if any substance, such as a stone or piece of iron, gets in the thrasher, the springs will allow the teeth to turn down, and allow a stone to pass through without breaking the teeth. These springs may be made of any material, or in any manner preferred that will produce the required result.

D is a covering for the cylinder. It is made of sheet-iron, and supported by the insides of the frame. One edge is bent down close to the cylinder, and has pieces cut out, to let the cylinder-teeth pass through. It is bent in shape as represented in fig. 2. Its use is to prevent the current of air produced by the motion of the cylinder driving dust into the feeder's face, and to form a passage for the dust over it, so that the dust may be carried off through the machine.

E is a conveyer. It may be made of sheet metal or wood, or of both, so that it may be of little weight. It is the same in width as the inside of the frame, and must be long enough to extend from underneath the thrashing-cylinder over the hulling-cylinder, as represented in figs. 1 and 2. The rear end has an aperture through it for the heads or bolls of clover to fall through into the hopper of the huller.

When thrashing grain a sliding piece covers the hole *b*, so that the grain is carried further, and dropped into the winnower.

This conveyer is supported at the rear end by sliding ways, and at the other end by adjustable supports, as represented in fig. 1, and is actuated by a connection from the crank in the shaft of the wheel G.

F is a separator used to separate grain and seed from the straw. It is made with two side pieces that support the bottom. The side pieces are suspended on the inside of the frame by links or slats, with a pivot-hole at each end. The slats should be so placed that they will raise the separator, when it is moved in a direction from the thrashing-cylinder, and a reciprocating motion is given to it by the connections from the crank-wheel G to it, as shown in fig. 1. The bottom is made of perforated sheet metal or thin boards, and is made in any required number of sections. The end of each section from the thrashing-cylinder should overlap the next section, and the two should be far enough apart for a shaft to be placed between them, thus making a place for grain to fall, and make a place to actuate the agitators in. At the rear end and under side is a short conveyer, that conveys the grain back to the winnower and seed to the huller that falls through the rear end.

G is a crank-wheel. There is one at each side of the machine, and a connection from each to the separator. One of these connections is shown in fig. 1, and part of it is represented by dotted lines.

H is one of a series of shafts that extends across the separator. Into them are fastened a series of agitators, as represented in fig. 4. Their use is to agitate the straw, to let the grain or seed fall out of the mass. At the end of each shaft is a crank to actuate them.

I is one of a series of elbows that is pivoted to the frame, as shown in fig. 1.

J is a coupling-bar. It couples the elbows together. It may be made long enough to couple any required number of elbows.

K is one of a series of connections that connects one part of the elbows to the cranks of the shafts H, as represented in fig. 1. They should be placed nearly in a vertical position, so that they may give a more uniform motion to the agitators while they are being carried backward and forward by and with the separator F.

L is a vibrating lever. Its shape and position are represented in fig. 1. It is held by a pin or bolt that passes through it, near the middle, on which it moves. The upper end is pivoted to the coupling J. At the lower end it is pivoted to the connection M from the crank-wheel on the fan-shaft. By the arrangement of these several parts a nearly uniform motion is given to the agitators, while their motion is much more rapid than the motion of the separator.

N is the fan. It is of ordinary construction, and is placed partly beneath the sills, as shown in fig. 1. The fan-shaft has a driving-pulley at one end, and a crank-wheel at the other, to actuate the agitators, and the crank-pin may be made adjustable by any of the well known devices, so that the motion of the agitators may be varied at will.

O is the hulling-cylinder. Its position is represented in fig. 2. It may be made in any ordinary manner. It is covered with iron, cut as a rasp. It is supported, with its shaft, in journal-boxes that are made in the heads of the concave.

P is one of the heads of the hulling-concave. It is made in two parts, and bolted together, as shown in fig. 1. The lower part terminates one way in a foot that rests upon the sill, and an arm the other way, that is fastened to a post to hold it in proper position. It is made of cast-iron, and on the surface is a series of projections that have a hole for a screw, as a nut. Through these holes bolts are screwed that hold the hulling-concave.

Q is the hulling-concave. It is made in any required number of sections, and is lined inside with iron cut as a rasp to hull the seed with. These sections are held in place by bolts that pass through each end, and into the projections of the heads P, as shown in fig. 1. By these bolts the concave may be adjusted in sections to the cylinder, so as to take in much or little seed, or to operate more or less severely according to the condition of the seed.

R is the winnower. It may be constructed in any ordinary manner, and be provided with the necessary sieves for all kinds of grain or seed. It is actuated, with the conveyer E, by means of a piece of iron. A part of it is held in a vertical position by journal-boxes fastened to one of the posts. The end above the upper box is bent in direction of the middle of the machine, and connected to the conveyer. The lower part is bent at right angles with the upper part, so that it will extend along the side of the winnower, and is connected to it with a short connection.

S is a sliding cover, to cover the aperture $b$ in the conveyer E, as represented in fig. 5. When thrashing grain it must be slid over the aperture, and when thrashing and hulling seed it must be slid back, to allow the seed to fall into the hopper of the huller.

I claim as my invention—

1. In the thrashing-machine herein described, the inclined frame A, provided with a series of holes, $a\ a$, in combination with the adjustable axle T and bolts $f$, constructed and arranged as shown, and for the purpose set forth.

2. The arrangement, herein shown, of the thrashing and hulling-cylinders B O with conveyer E, for the purpose set forth.

3. The combination of the thrashing-cylinder B with the covering D, provided with the openings $c\ d$, when constructed and arranged in the manner and for the purpose herein set forth.

4. The slide S, in combination with the conveyer E, hole $b$, and hulling-cylinder O, constructed and arranged as herein shown, and for the purpose set forth.

5. The arrangement of the parts H, I, J, K, L, and M, when used to give motion to the straw-agitators, as herein specified.

MONROE HUBBELL.

Witnesses:
WILLIAM H. BODLE,
CHARLES KETCHUM.